've*

United States Patent [19]

Kondo et al.

[11] Patent Number: 5,820,784
[45] Date of Patent: Oct. 13, 1998

[54] LIQUID CRYSTAL COMPOSTION AND LIQUID CRYSTAL DISPLAY DEVICE

[75] Inventors: Tomoyuki Kondo; Shuichi Matsui; Yasuyuki Koizumi; Koichi Shibata; Yasuhiro Haseba; Norihisa Hachiya; Etsuo Nakagawa; Kazutoshi Miyazawa, all of Chiba, Japan

[73] Assignee: Chisso Corporation, Osaka-fu, Japan

[21] Appl. No.: 606,032

[22] Filed: Feb. 22, 1996

[30] Foreign Application Priority Data

Feb. 22, 1995 [JP] Japan ................................. 7-059822
May 25, 1995 [JP] Japan ................................. 7-138625

[51] Int. Cl.$^6$ ........................... C09K 19/30; C09K 19/20
[52] U.S. Cl. ................................. 252/299.63; 252/299.67
[58] Field of Search ........................... 252/299.63, 299.67

[56] References Cited

U.S. PATENT DOCUMENTS

| | | |
|---|---|---|
| 5,271,865 | 12/1993 | Hittich et al. ................. 252/299.01 |
| 5,308,538 | 5/1994 | Weber et al. .................. 252/299.61 |
| 5,358,662 | 10/1994 | Hirose et al. ................. 252/299.63 |
| 5,387,369 | 2/1995 | Weber et al. .................. 252/299.01 |
| 5,389,295 | 2/1995 | Wachtler et al. .............. 252/299.63 |
| 5,397,505 | 3/1995 | Rieger et al. ................. 252/299.67 |
| 5,534,189 | 7/1996 | Nakagawa et al. ............. 252/299.63 |
| 5,543,077 | 8/1996 | Rieger et al. ................. 252/299.63 |
| 5,560,865 | 10/1996 | Nakagawa et al. ............. 252/299.01 |

*Primary Examiner*—C. H. Kelly
*Attorney, Agent, or Firm*—Wenderoth, Lind & Ponack

[57] ABSTRACT

A liquid crystal composition is disclosed which contains, as the first component, at least one compound expressed by the formula (I-a) or (I-b) and contains, as the second component, at least one compound expressed by any one of the formulas (II-a) to (II-g), each of the formulas being recited in the specification. According to the present invention, a liquid crystal composition which is particularly excellent in compatibility in low temperatures, and has a suitably large $\Delta n$ and a small $V_{th}$ can be provided while satisfying several characteristics required for liquid crystal compositions for AM-LCD.

18 Claims, No Drawings

LIQUID CRYSTAL COMPOSTION AND LIQUID CRYSTAL DISPLAY DEVICE

BACKGROUND OF THE INVENTION

1. Field of the Invention

The present invention relates to a nematic liquid crystal composition. More specifically, the present invention relates to a liquid crystal composition for active matrix LCD and a liquid crystal display device composed by using the liquid crystal composition.

2. Description of the Prior Art

Liquid crystal display devices have been obtained by filling a liquid crystal composition in a sealed cell formed between two substrates provided with transparent electrodes. LCD are low in consumptive electric power compared to CRT (cathode-ray tube display). In addition, LCD can be miniaturized and lightened. Thus, the LCD have been used in practice in such modes as twist nematic (TN) mode, super twisted nematic (STN) mode, and thin film transistor (TFT) scheme. Among them, active matrix LCD (AM-LCD) such as thin film transistor (TFT) has particularly been paid attention as a favorite of a flat display in harmony with the progress toward actualization of color-display devices and highly precision devices.

Liquid crystal compositions for AM-LCD are required to have the following characteristics:

1) They can be provided with a suitable optical anisotropy ($\Delta n$) depending on the thickness of a cell.
2) They have a high voltage holding ratio (VHR) to maintain the contrast of LCD at a high level.
3) They have a high speed electrooptical response to meet animation.
4) They have a wide mesomorphic range depending on the environment for use.
5) They can be provided with a suitable threshold voltage ($V_{th}$) depending on driving circuit.

That is, AM-LCD has adopted, as driving mode, a TN display mode in which molecular alignment of liquid crystal filled between upper and lower substrates are twisted by 90°. In this TN display mode, coloring due to an interference of liquid crystal cell caused at the time when voltage is not applied is a problem. In order to avoid this problem and to obtain a suitable contrast, it is necessary to set a product $\Delta n \cdot d$ of $\Delta n$ and cell thickness ($\mu m$) at a constant value, for example, 0.5 $\mu m$. Since there exists such restriction, a main stream of $\Delta n$ of liquid crystal compositions for TFT which have been practically used has generally become about 0.07 to 0.11, particularly 0.08 to 0.10 for 1st.Min. system.

In recent years, requirements for developing LCD having a high speed response is stronger with an object of meeting to animation. However, since the response speed ($\tau$) is proportional to the viscosity ($\eta$) of liquid crystal material, it is necessary to develop liquid crystal compositions having a low viscosity to achieve a high speed response.

Further, making the development of portable LCD an occasion, development of LCD on the assumption of outdoor use began to be studied. In order that liquid crystal compositions can stand outdoor use, it is necessary for LCD to display a nematic phase even in a range which exceeds a temperature range under the environment for use. While there are restrictions in the aspect of driving with respect to portable LCD, it is desired to miniaturize it to make it a lighter weight.

In order to meet such situation, liquid crystal materials of small consumptive electric power, that is liquid crystal materials having a low $V_{th}$ are desired. From such viewpoint, liquid crystal compositions having a nematic-isotropic phase transition temperature (clearing point: $T_{NI}$) of 60° C. or higher and having a smectic-nematic phase transition temperature ($T_{SN}$) of −20° C. or lower have become a main stream of liquid crystal compositions for TFT currently being used.

In order to meet such requirements, several kinds of liquid crystalline compounds and liquid crystal compositions containing the compounds have been developed up to now. For example, a composition having a comparatively large dielectric anisotropy ($\Delta E$) and comprising 15% by weight of a trifluoro-compound and 85% by weight of a difluoro-compound is disclosed in Application Example 2 of Unexamined Japanese Patent Publication No. 2-233626. However, this composition has defects that its $V_{th}$ is high, compatibility of the components contained therein is deteriorated particularly at low temperatures, its range of nematic phase is small, and viscosity is high.

Besides, an example of a composition comprising a trifluoro-compound and a difluoro-compound is disclosed in WO 94/03558. However, the compositions disclosed in its Examples 1 and 2 are insufficient for practical use since they have such a low clearing point as lower than 50° C. and have a $\Delta n$ of lower than 0.06. Further, the compositions disclosed in its Example 4 and subsequent Examples have a defect that $V_{th}$ is high.

Whereas liquid crystal compositions are being earnestly studied according to several purposes as mentioned above, it is not yet sufficient, and it is the present situation that new improvements are continually required.

SUMMARY OF THE INVENTION

An object of the present invention is to solve the problems of conventional technology as mentioned above and to provide a liquid crystal composition which is particularly excellent in compatibility at low temperatures, has a suitably large $\Delta n$, and has a small $V_{th}$ while satisfying several characteristics required for liquid crystal compositions for AM-LCD.

As a result of diligent research by the present inventors on compositions which have used several liquid crystalline compounds to achieve the objects mentioned above, the present invention has been realized.

Liquid crystal composition of the present invention is characterized by containing, as the first component, at least one compound expressed by the following formula (I-a) or (I-b)

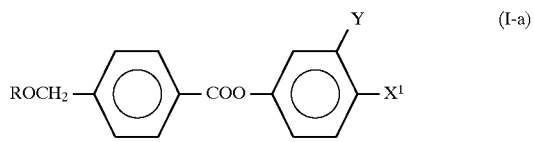

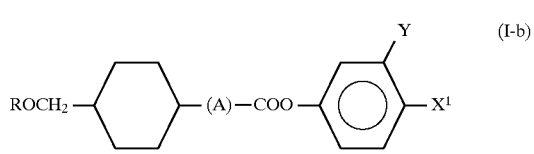

and containing, as the second component, at least one compound expressed by any one of the following formulas (II-a) to (II-g)

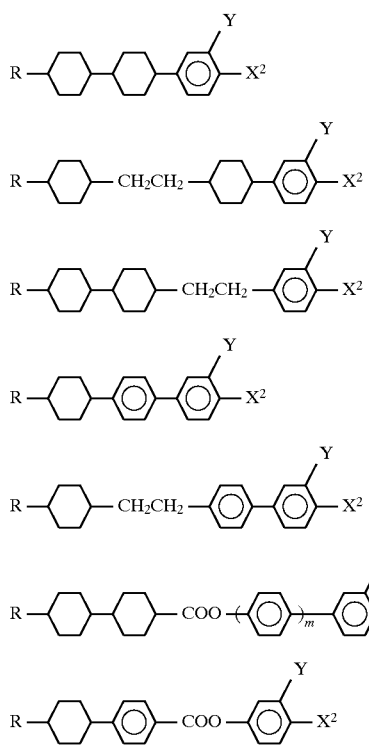

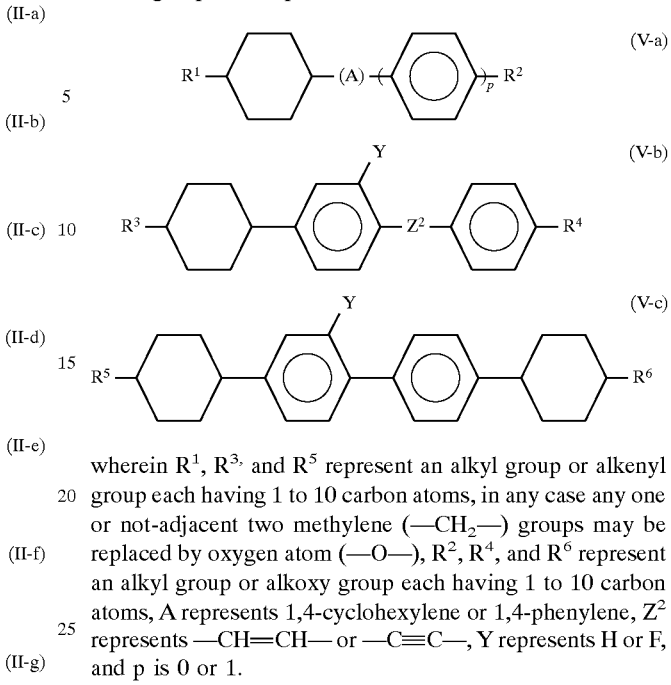

wherein R represents a linear alkyl group having 1 to 10 carbon atoms, A represents 1,4-cyclohexylene or 1,4-phenylene, $X^1$ represents $CF_3$ or $OCF_3$, $X^2$ represents F or $OCF_3$, Y represents H or F, and m is 0 or 1.

In the liquid crystal composition of the present invention, the content of the first component and the second component is 3 to 45% by weight (first component) and 55 to 97% by weight (second component), respectively, each based on the total weight of the liquid crystal composition.

Liquid crystal composition of the present invention may further contain a compound selected from the group consisting of the first group of compounds expressed by the following formula (III), the second group of compounds expressed by the following formula (IV-a) and/or (IV-b), or the third group of compounds expressed by any one of the following formulas (V-a) to (V-c) First group of compounds:

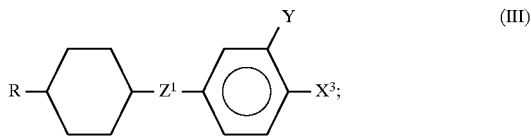

wherein R represents a linear alkyl group having 1 to 10 carbon atoms, $Z^1$ represents a single bond or $—C_2H_4—$, $X^3$ represents F or $OCF_3$, and Y represents H or F, Second group of compounds:

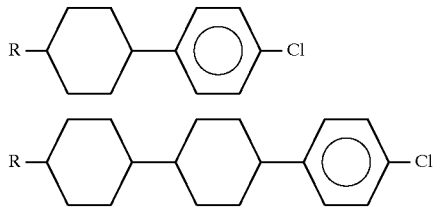

wherein R represents a linear alkyl group having 1 to 10 carbon atoms,

Third group of compounds:

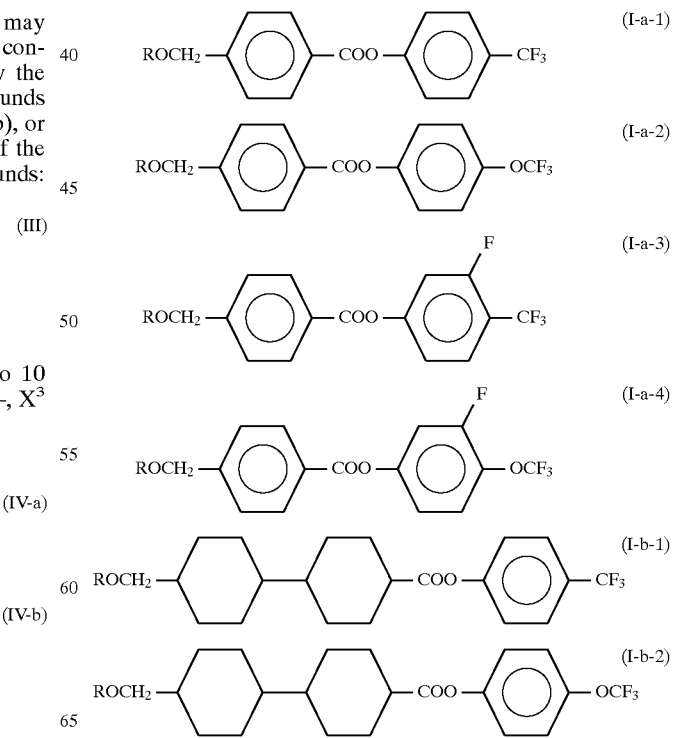

wherein $R^1$, $R^3$, and $R^5$ represent an alkyl group or alkenyl group each having 1 to 10 carbon atoms, in any case any one or not-adjacent two methylene ($—CH_2—$) groups may be replaced by oxygen atom ($—O—$), $R^2$, $R^4$, and $R^6$ represent an alkyl group or alkoxy group each having 1 to 10 carbon atoms, A represents 1,4-cyclohexylene or 1,4-phenylene, $Z^2$ represents $—CH=CH—$ or $—C\equiv C—$, Y represents H or F, and p is 0 or 1.

By using these liquid crystal compositions of the present invention, liquid crystal display devices which satisfy the object of the present invention can be obtained.

As preferable examples of compounds of the first component used in the liquid crystal compositions of the present invention, the compounds expressed by any one of the formulas (I-a-1) to (I-a-4) for the formula (I-a); and the formulas (I-b-1) to (I-b-8) for the formula (I-b) can be mentioned.

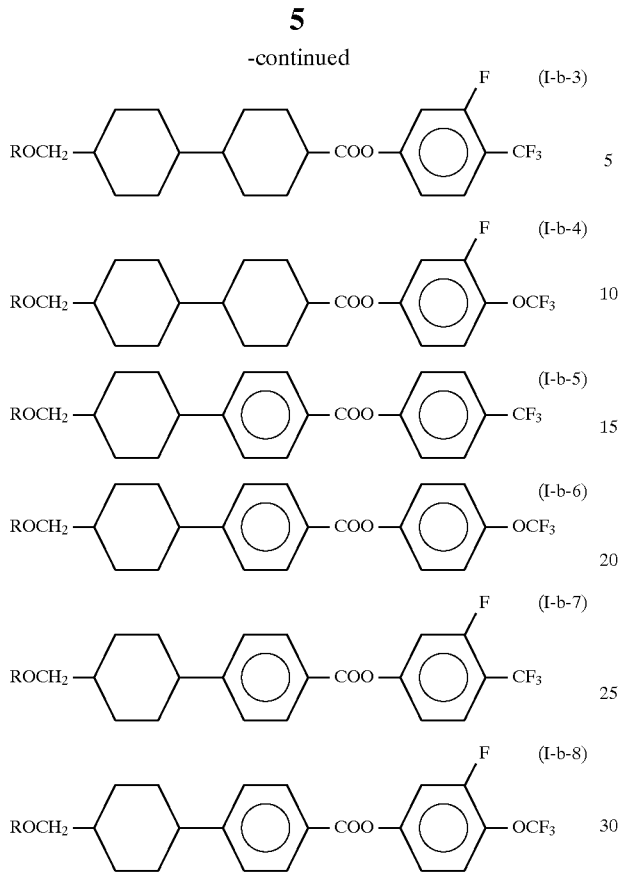

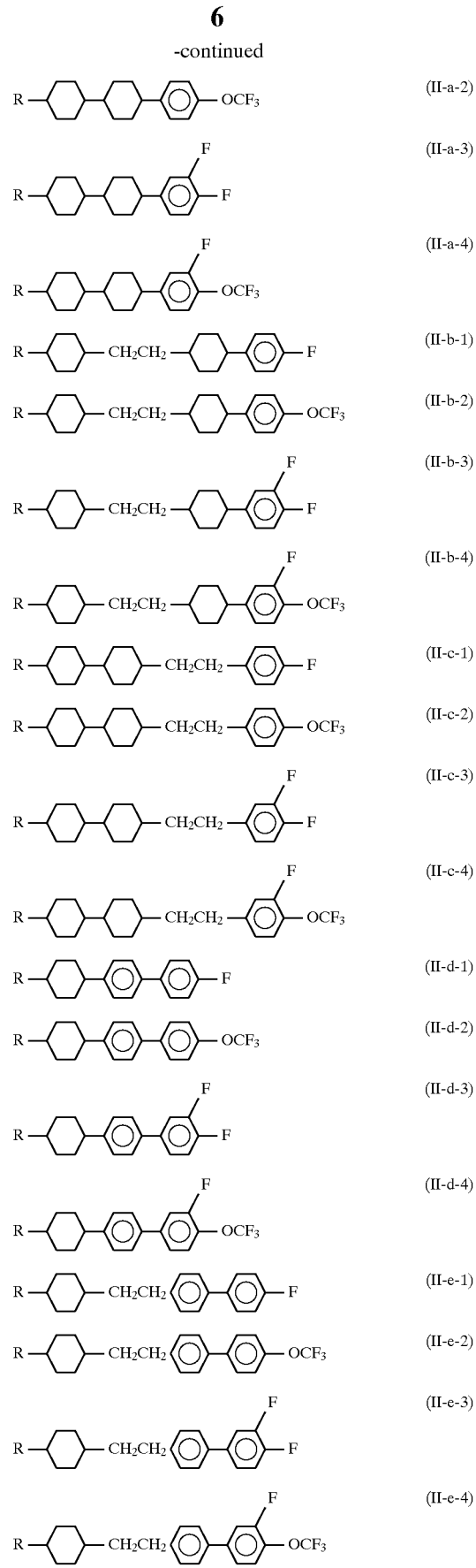

wherein R represents an alkyl group.

Among these compounds, particularly the compounds expressed by any one of the formulas (I-a-2), (I-a-4), (I-b-4), (I-b-5), and (I-b-8) are preferably used.

Whereas the compounds of the first component generally exhibit a large $\Delta\epsilon$ of 13 to 20, they have a low viscosity considering the $\Delta\epsilon$. Also, since they have a small value of $\Delta n$ and a low $V_{th}$, and are excellent in heat stability and chemical stability, they assume the role of adjusting $\Delta n$ while particularly maintaining $V_{th}$ of the liquid crystal compositions for TFT at a low level.

Content of the first component is 3 to 45% by weight and preferably 5 to 40% by weight based on the total weight of liquid crystal composition. When the content is less than 3% by weight, effect of improving compatibility at low temperatures, suitably large $\Delta n$, and low $V_{th}$ which are objects of the present invention becomes difficult to obtain. Conversely, when the content is increased beyond 45% by weight, sometimes viscosity of liquid crystal composition becomes high and $\Delta n$ becomes excessively low, which are not preferable.

As preferable examples of compounds of the second component used in the liquid crystal compositions of the present invention, the compounds expressed by any one of the formulas (II-a-1) to (II-a-4) for the formula (II-a); the formulas (II-b-1) to (II-b-4) for the formula (II-b); the formulas (II-c-1) to (II-c-4) for the formula (II-c); the formulas (II-d-1) to (II-d-4) for the formula (II-d), the formulas (II-e-1) to (II-e-4) for the formula (II-e), (II-f-1) to (II-f-8) for the formula (II-f), and (II-g-1) to (II-g-4) for the formula (II-g) can be mentioned.

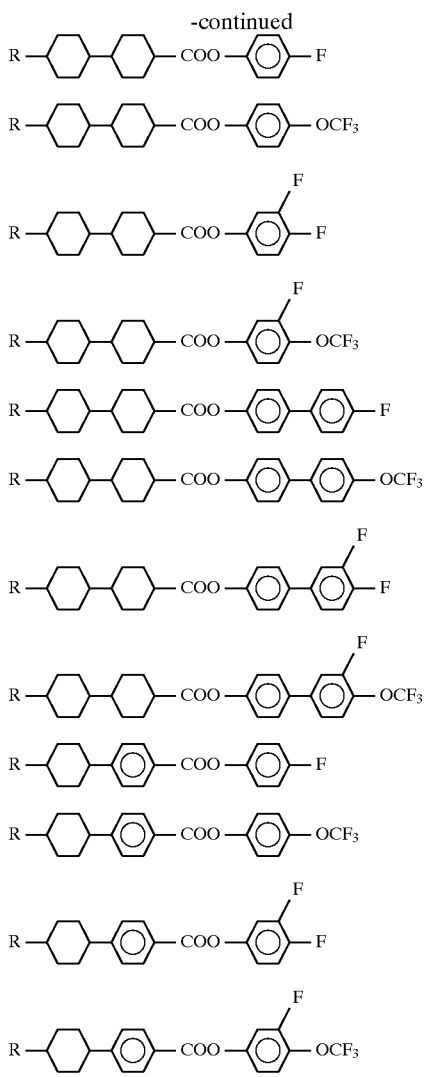

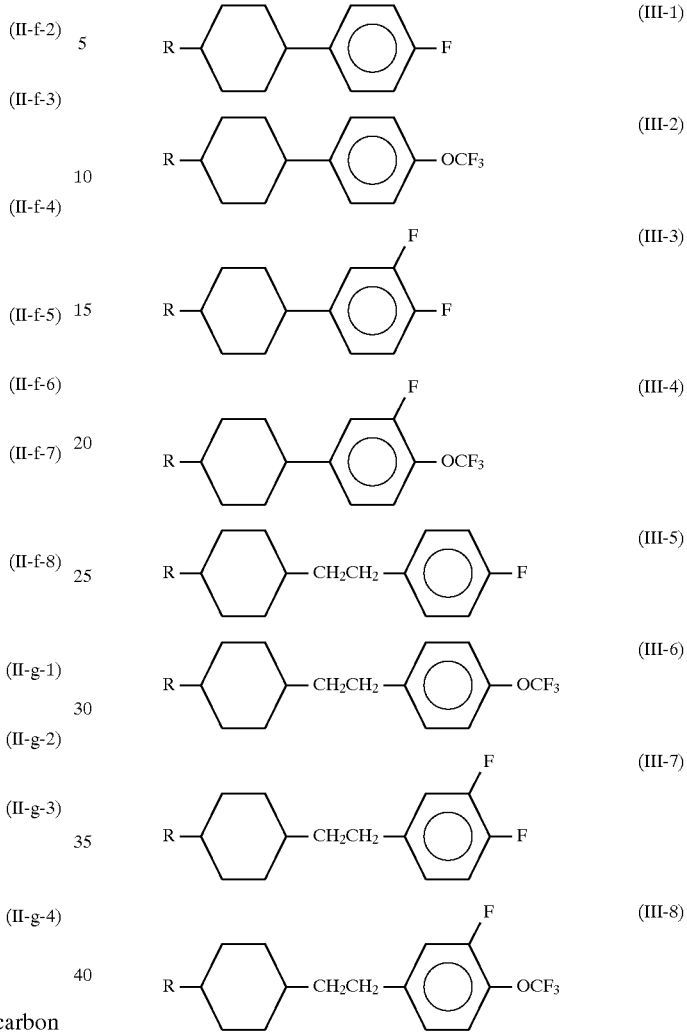

wherein R represents an alkyl group having 1 to 10 carbon atoms.

Among these compounds, particularly the compounds expressed by any one of the formulas (II-a-1), (II-a-2), (II-a-3), (II-b-2), (II-b-3), (II-c-2), (II-c-3),(II-d-1),(II-d-3), (II-e-3), (II-f-1), (II-f-5), and (II-g-1) are preferably used.

Since the compounds of the second component have a $\Delta\epsilon$ generally in a range of 5 to 10 and are excellent in heat stability and chemical stability, they are well known as preferable compounds for the component of compositions for low voltage TFT. In addition to this fact, since they have a clearing point ($T_{NI}$) in a range of about 90 to about 130° C., the compounds are most suitable as base compounds of the compositions for low voltage TFT.

The content of the second component is 55 to 97% by weight and preferably 60 to 95% by weight based on the total weight of liquid crystal composition. When the content is less than 55% by weight, the compatibility of the liquid crystal composition will sometimes be deteriorated particularly at low temperatures. Conversely, when the content is increased beyond 97% by weight, effect of producing low viscosity which is one of the objects of the present invention becomes difficult to obtain.

Among the first group to the third group of compounds which can be further added to the liquid crystal compositions of the present invention, the compounds expressed by any one of the formulas (III-1) to (III-8) can be mentioned as preferable compounds expressed by the formula (III) of the first group.

wherein R represents an alkyl group having 1 to 10 carbon atoms.

Among these compounds, particularly the compounds expressed by any one of the formulas (III-1), (III-3), and (III-5) are preferably used.

Compounds of the first group are bicyclic ones and particularly take the role of lowering $V_{th}$ of liquid crystal composition. Its content is generally 30% by weight or less based on the total weight of liquid crystal composition to prevent the clearing point of the liquid crystal composition from being excessively lowered.

Next, the compounds expressed by the formula (IV-a) or (IV-b) of the second group are bicyclic or tricyclic chloride (Cl) type compounds and assume the role of principally reducing the viscosity of liquid crystal composition. Since these compounds have a small $\Delta\epsilon$ of about 6, they will sometimes raise $V_{th}$ of liquid crystal composition when used in a large amount. Accordingly, its content is preferably 35% by weight or less based on the total weight of liquid crystal composition.

As preferable examples of the compounds of the third group, compounds expressed by any one of the formulas (V-a-1) to (V-a-9) for the formula (V-a); the formulas (V-b-1) to (V-b-4) for the formula (V-b); and the formulas (V-c-1) to (V-c-3) for the formula (V-c) can be mentioned.

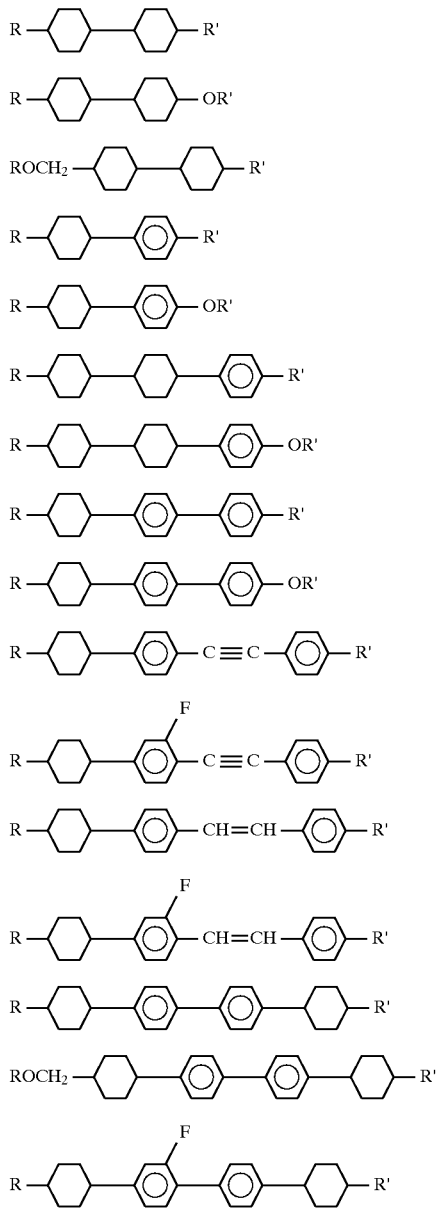

wherein R and R' independently represent an alkyl group or alkenyl group.

Among these compounds, the ones expressed by any one of the formulas (V-a-1), (V-a-3), (V-a-5), (V-a-6), (V-a-7), (V-b-2), (V-b-4), (V-c-1), (V-c-2), and (V-c-3) are preferably used.

These compounds of the third group have a bi-, tri-, or tetracyclic structure and exhibit a negative or small positive $\Delta\epsilon$. Among these, bi- or tricyclic compounds are used with a purpose of mainly reducing viscosity and/or adjusting $\Delta n$ of the composition. Also, tetracyclic compounds are used with a purpose of expanding the nematic range by, for instance, raising the clearing point ($T_{NI}$) and/or with a purpose of adjusting $\Delta n$ and viscosity. Its content is preferably 30% by weight or less based on the total weight of liquid crystal composition.

In order to achieve the objects of the present invention, the sum of the amount of the compounds of the first, second, and third group should not exceed 42% by weight based on the total weight of liquid crystal composition, and it is preferably 35% by weight or less in usual cases.

Liquid crystal composition of the present invention may contain one or more other compounds in an appropriate amount in addition to the compounds of the first group to the third group of compounds mentioned above with the purpose of the present invention, for example, with the purpose of improving $V_{th}$, nematic range, $\Delta n$, $\Delta\epsilon$, and viscosity.

Liquid crystal compositions of the present invention are produced by conventional methods, for instance, by dissolving several components in each other at a high temperature or by dissolving each component in an organic solvent, mixing them, and distilling off the solvent under a reduced pressure.

Further, the compositions are improved by incorporating a suitable additive depending on an intended application, and optimized. These additives are well known in the art and described in reference books. Usually, a chiral dopant and other materials are added to induce the spiral structure of liquid crystal composition to adjust a required twist angle and to prevent reverse twist.

Still further, the compositions can be used as the liquid crystal compositions for guest-host (GH) mode if dichronic dye such as a merocyanine type, styryl type, azo type, azomethine type, azoxy type, quinophthalone type, anthraquinone, and tetrazine type is added. Liquid crystal compositions of the present invention can be used for a polymer dispersion type liquid crystal display devices (PDLCD) typified by NCAP which is prepared by forming a nematic liquid crystal into a microcapsule or typified by a polymer network liquid display device (PNLCD) which is prepared by forming a polymer of three-dimensional network structure in a liquid crystal. Also, the liquid crystal compositions of the present invention can be used for electrically controlled birefringence (ECB) type or dynamic scattering (DS) type.

According to the present invention, a liquid crystal composition which is particularly excellent in compatibility in low temperatures, and has a suitably large $\Delta n$ and a small $V_{th}$ can be provided while satisfying several characteristics required for liquid crystal compositions for AM-LCD.

EXAMPLES

The present invention will be described in further detail below with reference to Examples. However, it should be understood that the present invention is by no means restricted by such specific Examples.

In the compositions shown in each of Examples and Comparative Examples, indication of compounds is given according to the definition shown in Table 1 below in which left side end group is expressed by n-, nO-, nOm-, V-, Vn-, nVm-, or nVmVk- (n, m, and k is an integer of 1 or more); bonding group is expressed by 2, 4, E, T, V, CF2O, or OCF2; ring structure is expressed by B, B(F), B(F,F), H, Py, D, or Ch, and right side end group is expressed by —F, —CL, —C, —CF3, —OCF3, —OCF2H, -n, —On, —EMe, —nV, or —mVn (n and m is an integer of 1 or more), respectively. Symbol "%" indicating the content of each compound means "% by weight" unless otherwise specified.

Data of characteristics of liquid crystal compositions are shown by $T_{NI}$ (clearing point), $T_{SN}$ (smectic-nematic phase transition point), η20 (viscosity at 20° C.), $\Delta n$ (optical anisotropy at 25° C.), $\Delta\epsilon$ (dielectric anisotropy at 25° C.), $V_{th}$ (threshold voltage at 20° C.), and VHR (voltage holding ratio obtained based on area method) at 25° C. In these characteristics, $T_{SN}$ was judged by the liquid crystal phase after a composition was left as it is for 30 days in freezers each kept at 0° C., -10° C., -20° C., or -30° C.

TABLE 1

| Left side end group | Symbol |
| --- | --- |
| $C_nH_{2n+1}-$ | n— |
| $C_nH_{2n+1}O-$ | nO— |
| $C_nH_{2n+1}OC_mH_{2m}-$ | nOm— |
| $CH_2=CH-$ | V— |
| $CH_2=CHC_nH_{2n}-$ | Vn— |
| $C_nH_{2n+1}CH=CHC_mH_{2m}-$ | nVm— |
| $C_nH_{2n+1}CH=CHC_mH_{2m}CH=CHC_kH_{2k}-$ | nVmVk— |

| Bonding group | Symbol |
| --- | --- |
| $-C_2H_4-$ | 2 |
| $-C_4H_3-$ | 4 |
| $-COO-$ | E |
| $-C\equiv C-$ | T |
| $-CH=CH-$ | V |
| $-CF_2O-$ | CF2O |
| $-OCF_2-$ | OCF2 |

| Ring structure | Symbol |
| --- | --- |
| 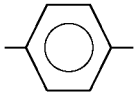 | B |
| 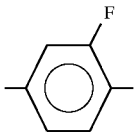 | B(F) |
| 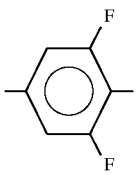 | B(F, F) |
| 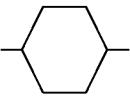 | H |
| 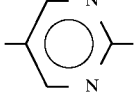 | Py |
| 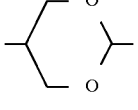 | D |
| 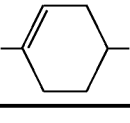 | Ch |

| Right side end group | Symbol |
| --- | --- |
| —F | —F |
| —Cl | —CL |
| —CN | —C |
| —CF$_3$ | —CF3 |
| —OCF$_3$ | —OCF3 |
| —OCF$_2$H | —OCF2H |
| —C$_n$H$_{2n+1}$ | —n |
| —OC$_n$H$_{2n+1}$ | —On |

TABLE 1-continued

| —COOCH$_3$ | —EMe |
| —c$_n$H$_{2n}$CH=CH$_2$ | —nV |
| —C$_m$H$_{2m}$CH=CHC$_n$H$_{2n+1}$ | —mVn |

Comparative Example 1

Following composition is disclosed in Application Example 2 of unexamined Japanese Patent Publication No. 2-233626 mentioned above:

| 3-HHB (F, F)-F | 15.0% |
| 2-HHB (F)-F | 28.4% |
| 3-HHB (F)-F | 28.3% |
| 5-HHB (F)-F | 28.3% |

Characteristics of this composition were obtained and results were as follows:

$T_{NI}$=110.7° C.

$T_{SN}$<0° C.

η20=25.0 mPa.s

Δn=0.077

$V_{th}$=2.32 V

VHR=98.8%

As will be clear from the results mentioned above, it can be understood that this liquid crystal composition has a high $V_{th}$, is poor in compatibility at low temperatures ($T_{SN}$ is high), besides, exhibits a slightly small Δn, and thus it is insufficient for practical use.

Comparative Example 2

The following composition is disclosed in Example 1 of WO 94/03558 mentioned above:

| 7-HB (F, F)-F | 10.0% |
| 2-HHB (F, F)-F | 25.0% |
| 3-HHB (F, F)-F | 35.0% |
| 5-HHB (F, F)-F | 18.0% |
| 7-HB (F)-F | 12.0% |

Characteristics of this composition were obtained and results were as follows:

$T_{NI}$=42.9° C.

$T_{SN}$<0° C.

η20=22.2 mPa.s

Δn=0.059

$V_{TH}$=1.07 V

VHR=98.7%

As will be clear from the results mentioned above, it can be understood that whereas this liquid crystal composition has a low $V_{th}$, it has a low $T_{NI}$ (clearing point), is poor in compatibility at low temperatures ($T_{SN}$ is high), and exhibits a small Δn, and thus it is insufficient for practical use.

Comparative Example 3

The following composition is disclosed in Example 2 of the WO 94/03558 mentioned in Comparative Example 2:

| | |
|---|---|
| 2-HHB (F, F)-F | 26.0% |
| 3-HHB (F, F)-F | 26.0% |
| 5-HHB (F, F)-F | 26.0% |
| 7-HB (F)-F | 12.0% |
| 5-H2B (F)-F | 10.0% |

Characteristics of this composition were obtained and results were as follows:

$T_{NI}$=46.0° C.

$T_{SN}$<0° C.

$\eta 20$=21.6 mPa.s $\Delta n$=0.058

$V_{TH}$=1.17 V

VHR=98.5%

As will be clear from the results mentioned above, it can be understood that whereas this liquid crystal composition has a low $V_{th}$, it has a low $T_{NI}$ (clearing point), is poor in compatibility at low temperatures ($T_{SN}$ is high), and has a small $\Delta n$, and thus it is insufficient for practical use.

Example 1

Liquid crystal composition comprising the following compounds in the following content was prepared:

| | |
|---|---|
| 3O1-BEB (F)-OCF3 | 5.0% |
| 2-HHB (F)-F | 10.0% |
| 3-HHB (F)-F | 10.0% |
| 5-HHB (F)-F | 10.0% |
| 2-H2HB (F)-F | 14.0% |
| 3-H2HB (F)-F | 7.0% |
| 5-H2HB (F)-F | 14.0% |
| 2-HBB (F)-F | 7.5% |
| 3-HBB (F)-F | 7.5% |
| 5-HBB (F)-F | 15.0% |

Characteristics of this composition were obtained and results were as follows:

$T_{NI}$=88.5° C.

$T_{SN}$<−30° C.

$\eta 20$=26.5 mPa.s $\Delta n$=0.093

$\Delta \epsilon$=5.1

$V_{th}$=2.11 V

VHR=98.6%

This liquid crystal composition is remarkably excellent in compatibility at low temperatures ($T_{SN}$ is low) compared with those in Comparative Examples 1 to 3, and besides, has a large $\Delta n$.

Further, it can be understood that whereas $T_{NI}$ is high such an extent that there is no problem for practical use, $V_{th}$ is low compared to those of Comparative Examples.

Example 2

Liquid crystal composition comprising the following compounds in the following content was prepared:

| | |
|---|---|
| 3O1-BEB (F)-OCF3 | 10.0% |
| 5O1-BEB-OCF3 | 3.0% |
| 5O1-HBEB-CF3 | 10.0% |
| 3O1-HBEB (F)-OCF3 | 5.0% |
| 1O1-HHEB (F)-OCF3 | 12.0% |
| 7-HB (F)-F | 5.0% |
| 2-HHB (F)-F | 5.0% |
| 3-HHB (F)-F | 5.0% |
| 5-HHB (F)-F | 5.0% |
| 2-H2HB (F)-F | 8.0% |
| 3-H2HB (F)-F | 4.0% |
| 5-H2HB (F)-F | 8.0% |
| 2-HBB (F)-F | 5.0% |
| 3-HBB (F)-F | 5.0% |
| 5-HBB (F)-F | 10.0% |

Characteristics of this composition were obtained and results were as follows:

$T_{NI}$=66.5° C.

$T_{SN}$<−30° C.

$\eta 20$=34.9 mPa.s $\Delta n$=0.090

$\Delta \epsilon$=9.7

$V_{th}$=1.23 V

VHR=98.6%

This composition is remarkably excellent in compatibility at low temperatures ($T_{SN}$ is low) compared to those in Comparative Examples 1 to 3 and also has a high $\Delta n$. Further, it can be understood that whereas $T_{NI}$ (clearing point) is high such an extent that there is no problem for practical use, $V_{th}$ is low compared to that of Comparative Example 1.

Example 3

Liquid crystal composition comprising the following compounds in the following content was prepared:

| | |
|---|---|
| 1O1-HHEB (F)-OCF3 | 5.0% |
| 2-HHB (F)-F | 9.0% |
| 3-HHB (F)-F | 9.0% |
| 5-HHB (F)-F | 9.0% |
| 2-H2HB (F)-F | 4.0% |
| 3-H2HB (F)-F | 2.0% |
| 5-H2HB (F)-F | 4.0% |
| 3-HBB-F | 2.0% |
| 2-HBB (F)-F | 4.0% |
| 3-HBB (F)-F | 4.0% |
| 5-HBB (F)-F | 8.0% |
| 3-H2BB (F)-F | 8.0% |
| 3-HB-CL | 6.0% |
| 5-HB-CL | 6.0% |
| 7-HB-CL | 6.0% |
| 2-HHB-CL | 6.0% |
| 3-HHB-CL | 4.0% |
| 5-HHB-CL | 4.0% |

Characteristics of this composition were obtained and results were as follows:

$T_{NI}$=89.9° C.

$T_{SN}$<−20° C.

$\eta 20$=21.8 mPa.s $\Delta n$=0.101

$\Delta \epsilon$=5.0

$V_{th}$=2.31 V

VHR=98.7%

Example 4

Liquid crystal composition comprising the following compounds in the following content was prepared:

| | |
|---|---|
| 3O1-HBEB (F)-OCF3 | 5.0% |
| 3O1-BEB (F)-OCF3 | 10.0% |
| 2-HHB (F)-F | 13.4% |
| 3-HHB (F)-F | 13.3% |
| 5-HHB (F)-F | 13.3% |
| 3-HHB-OCF3 | 8.0% |
| 2-H2HB (F)-F | 4.0% |
| 3-H2HB (F)-F | 2.0% |
| 5-H2HB (F)-F | 4.0% |
| 3-H2HB-OCF3 | 3.0% |
| 5-HH2B-OCF3 | 5.0% |
| 7-HB-F | 4.0% |
| 7-HB (F)-F | 7.0% |
| 5-H2HB (F, F)-F | 3.0% |
| 3-HH2B (F, F)-F | 5.0% |

Characteristics of this composition were obtained and results were as follows:

$T_{NI}$=71.7° C.
$T_{SN}$<-30° C.
$\eta 20$=22.8 mPa.s
$\Delta n$=0.082
$\Delta \epsilon$=5.8
$V_{th}$=1.91 V
VHR=98.7

This liquid crystal composition was remarkably excellent in compatibility at low temperatures ($T_{SN}$ is low) compared with those of Comparative Examples 1 to 3 and has a large $\Delta n$. Further, it can be understood that whereas $T_{NI}$ (clearing point) is high such an extent that there is no problem for practical use, $V_{th}$ is low compared to that of Comparative Example 1.

Example 5

Liquid crystal composition comprising the following compounds in the following content was prepared:

| | |
|---|---|
| 3O1-BEB (F)-OCF3 | 3.0% |
| 5O1-BEB-OCF3 | 3.0% |
| 3O1-HBEB (F)-OCF3 | 3.0% |
| 2-HHB-(F)-F | 12.0% |
| 3-HHB (F)-F | 12.0% |
| 5-HHB (F)-F | 12.0% |
| 2-H2HB (F)-F | 8.0% |
| 3-H2HB (F)-F | 4.0% |
| 5-H2HB (F)-F | 8.0% |
| 2-HBB-(F)-F | 5.0% |
| 3-HBB-(F)-F | 5.0% |
| 5-HBB-(F)-F | 10.0% |
| 3-HBEB-F | 5.0% |
| 3-HHEB-F | 5.0% |
| 5-HHEB-F | 5.0% |

Characteristics of this composition were obtained and results were as follows:

$T_{NI}$=99.8° C.
$T_{SN}$<-30° C.
$\eta 20$=27.9 mPa.s
$\Delta n$=0.095
$\Delta \epsilon$=6.3
$V_{th}$=2.10 V
VHR=98.3%

Example 6

Liquid crystal composition comprising the following compounds in the following content was prepared:

| | |
|---|---|
| 5O1-HBEB-CF3 | 5.0% |
| 3-HHB-F | 6.0% |
| 2-HHB (F)-F | 7.0% |
| 3-HHB (F)-F | 7.0% |
| 5-HHB (F)-F | 7.0% |
| 3-HH2B-OCF3 | 4.0% |
| 5-HH2B-OCF3 | 6.0% |
| 2-HBB (F)-F | 6.0% |
| 3-HBB (F)-F | 6.0% |
| 5-HBB (F)-F | 12.0% |
| 7-HB (F)-F | 6.0% |
| 3-HHEBB-F | 3.0% |
| 5-HHEBB-F | 3.0% |
| 3-HB-O2 | 8.0% |
| 3-HHB-1 | 4.0% |
| 3-HHB-O1 | 2.0% |
| V-HHB-1 | 2.0% |
| 3-HH-4 | 4.0% |
| 101-HH5 | 2.0% |

Characteristics of this composition were obtained and results were as follows:

$T_{NI}$=106.2° C.
$T_{SN}$<-30° C.
$\eta 20$=22.2 mPa.s
$\Delta n$=0.094
$\Delta \epsilon$=4.1
$V_{th}$=2.30 V
VHR=98.6%

Example 7

Liquid crystal composition comprising the following compounds in the following content was prepared:

| | |
|---|---|
| 3O1-BEB (F)-OCF3 | 10.0% |
| 1O1-HHEB (F)-OCF3 | 5.0% |
| 3O1-HBEB-(F)-OCF3 | 3.0% |
| 3-HHB-F | 4.0% |
| 2-HHB-(F)-F | 6.0% |
| 3-HHB-(F)-F | 6.0% |
| 5-HHB-(F)-F | 6.0% |
| 3-H2HB-OCF3 | 4.0% |
| 5-H2HB-OCF3 | 4.0% |
| 2-HBB-F | 4.0% |
| 3-HBB-F | 4.0% |
| 2-HBB-(F)-F | 6.0% |
| 3-HBB (F)-F | 6.0% |
| 5-HBB (F)-F | 12.0% |
| 7-HB (F)-F | 4.0% |
| 5-H2B (F)-F | 2.0% |
| 3-HB (F) VB-2 | 4.0% |
| 3-HB (F) T-3 | 4.0% |
| 3-HB (F) T-4 | 3.0% |
| 7-HB (F, F)-F | 3.0% |

Characteristics of this composition were obtained and results were as follows:

$T_{NI}$=84.5° C.
$T_{SN}$<-30° C.
$\eta 20$=25.6 mPa.s
$\Delta n$=0.105
$\Delta \epsilon$=5.4
$V_{th}$=2.10 V
VHR=98.5%

Example 8

Liquid crystal composition comprising the following compounds in the following content was prepared:

| | |
|---|---|
| 3O1-BEB (F)-OCF3 | 10.0% |
| 1O1-HHEB (F)-OCF3 | 10.0% |
| 3-HHB-F | 5.0% |
| 2-HHB (F)-F | 12.0% |
| 3-HHB (F)-F | 12.0% |
| 5-HHB (F)-F | 12.0% |
| 3-HH2B-OCF3 | 3.0% |
| 2-HBB (F)-F | 4.0% |
| 3-HBB (F)-F | 4.0% |
| 5-HBB (F)-F | 8.0% |
| 3-HB-O2 | 10.0% |
| 3-HHB-1 | 4.0% |
| 3-HHB-O1 | 3.0% |
| 1O1-HBBH-3 | 3.0% |

Characteristics of this composition were obtained and results were as follows:

$T_{NI}$=94.9° C.
$T_{SN}$<−30° C.
η20=24.9 mPa.s
Δn=0.099
Δε=5.3
$V_{th}$=2.30 V
VHR=98.9%

Example 9

Liquid crystal composition comprising the following compounds in the following content was prepared:

| | |
|---|---|
| 3O1-BEB (F)-OCF3 | 6.0% |
| 2-HHB (F)-F | 10.0% |
| 3-HHB (F)-F | 10.0% |
| 5-HHB (F)-F | 10.0% |
| 2-H2HB (F)-F | 6.0% |
| 3-H2HB (F)-F | 3.0% |
| 5-H2HB (F)-F | 6.0% |
| 3-HH2B-OCF3 | 5.0% |
| 2-HBB (F)-F | 2.5% |
| 3-HBB (F)-F | 2.5% |
| 5-HBB (F)-F | 5.0% |
| 5-HB-F | 6.0% |
| 7-HB (F)-F | 6.0% |
| 3-HB-CL | 4.0% |
| 3-HHEB-F | 2.0% |
| 3-HBEB-F | 2.0% |
| 3-HH-5 | 3.0% |
| 1O1-HH-5 | 3.0% |
| 3-HB-O4 | 4.0% |
| 3-H2BB (F, F)-F | 4.0% |

Characteristics of this composition were obtained and results were as follows:

$T_{NI}$=98.8° C.
$T_{SN}$<−30° C.
η20=18.1 mPa.s
Δn=0.083
Δε=5.7
$V_{th}$=2.09 V
VHR=98.8%

Example 10

Liquid crystal composition comprising the following compounds in the following content was prepared:

| | |
|---|---|
| 1O1-HHEB (F)-OCF3 | 15.0% |
| 5-HB-F | 8.0% |
| 6-HB-F | 8.0% |
| 7-HB-F | 8.0% |
| 3-HBB (F)-F | 10.0% |
| 5-HBB (F)-F | 10.0% |
| 2-HHB-OCF3 | 7.0% |
| 3-HHB-OCF3 | 7.0% |
| 4-HHB-OCF3 | 7.0% |
| 5-HHB-OCF3 | 7.0% |
| 3-HH2B-OCF3 | 4.0% |
| 5-HH2B-OCF3 | 4.0% |
| 3-HH2B(F)-F | 4.0% |
| 3-HBBH-5 | 2.0% |
| 3-HB (F) BH-3 | 2.0% |

What is claimed is:

1. A liquid crystal composition containing, as the first component, at least one compound expressed by the following formulas (I-a) or (I-b)

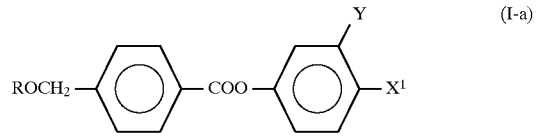

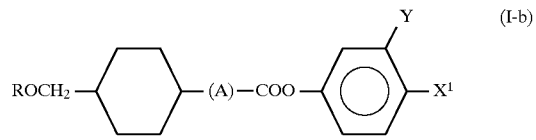

and containing, as the second component, at least one compound expressed by any one of the following formulas (II-a) to (II-g)

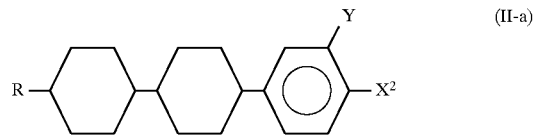

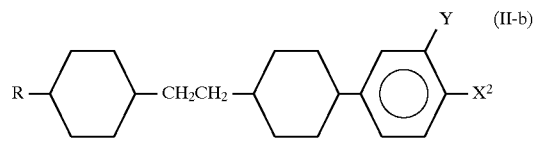

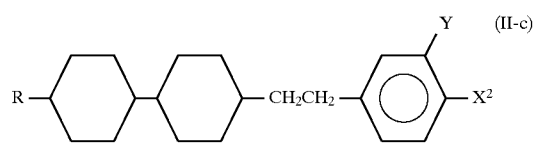

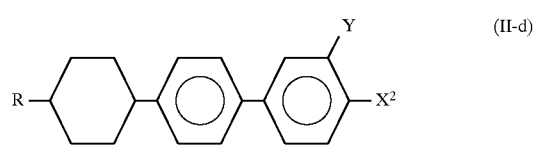

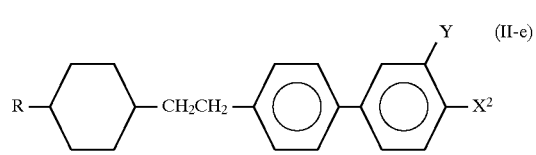

-continued

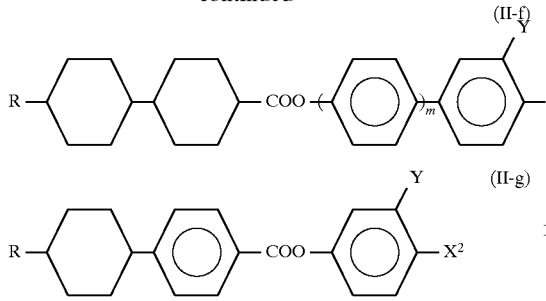

(II-f)

(II-g)

wherein R represents a linear alkyl group having 1 to 10 carbon atoms, A represents 1,4-cyclohexylene or 1,4-phenylene, $X^1$ represents $CF_3$ or $OCF_3$, $X^2$ represents F or $OCF_3$, Y represents H or F, and m is 0 or 1.

2. The liquid crystal composition according to claim 1 wherein the first component and the second component are contained in the composition in an amount of 3 to 45% by weight and 55 to 97% by weight, respectively, each based on the total weight of the liquid crystal composition.

3. The liquid crystal composition according to claim 1 or 2 wherein the liquid crystal composition further contains a compound expressed by the formula (III)

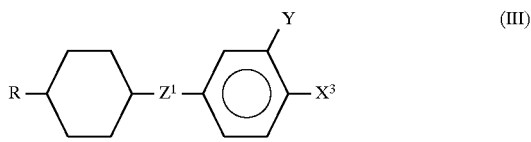

(III)

wherein R represents a linear alkyl group having 1 to 10 carbon atoms, $Z^1$ represents a single bond or $—C_2H_4—$, $X^3$ represents F or $OCF_3$, and Y represents H or F.

4. The liquid crystal composition according claim 1 or 2 wherein the liquid crystal composition further contains a compound expressed by the following formula (IV-a) and/or (IV-b)

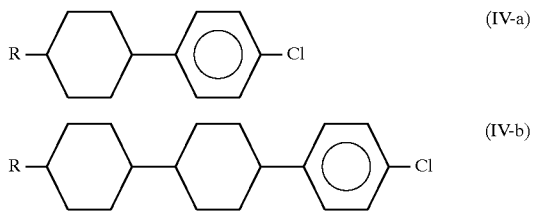

(IV-a)

(IV-b)

wherein R represents a linear alkyl group having 1 to 10 carbon atoms.

5. The liquid crystal composition according to claim 1 or 2 wherein the liquid crystal composition further contains a compound expressed by any one of the following formulas (V-a) to (V-c)

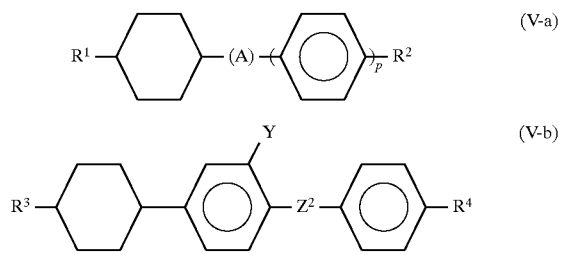

(V-a)

(V-b)

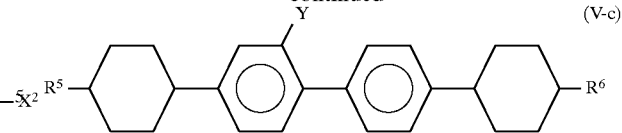

(V-c)

wherein $R^1$, $R^3$, and $R^5$ represent an alkyl group or alkenyl group each having 1 to 10 carbon atoms, in any case any one or not-adjacent two methylene ($—CH_2—$) groups may be replaced by oxygen atom ($—O—$), $R^2$, $R^4$, and $R^6$ represent an alkyl group or alkoxy group each having 1 to 10 carbon atoms, A represents 1,4-cyclohexylene or 1,4-phenylene, $Z^2$ represents $—CH=CH—$ or $—C\equiv C—$, Y represents H or F, and p is 0 or 1.

6. A liquid crystal display device comprising the liquid crystal composition defined in claim 1.

7. A liquid crystal display device comprising the liquid crystal composition defined in claim 2.

8. A liquid crystal display device comprising the liquid crystal composition defined in claim 3.

9. A liquid crystal display device comprising the liquid crystal composition defined in claim 4.

10. A liquid crystal display device comprising the liquid crystal composition defined in claim 5.

11. The liquid crystal composition according to claim 3 wherein the liquid crystal composition further contains a compound expressed by the following formula (IV-a) and/or (IV-b)

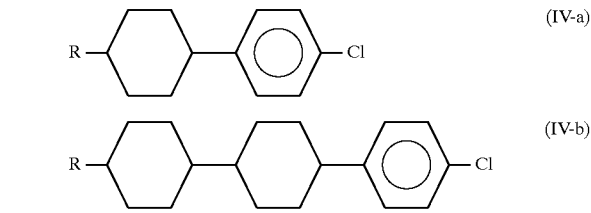

(IV-a)

(IV-b)

wherein R represents a linear alkyl group having 1 to 10 carbon atoms.

12. The liquid crystal composition according to claim 3 wherein the liquid crystal composition further contains a compound expressed by any one of the following formulas (V-a) to (V-c)

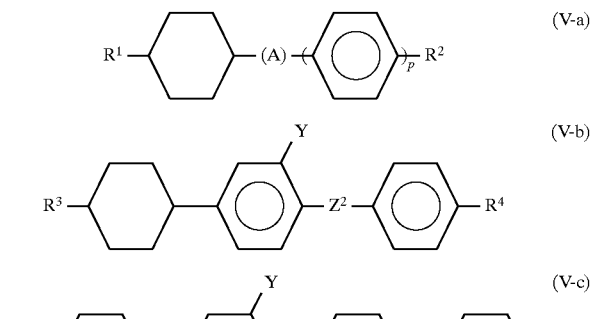

(V-a)

(V-b)

(V-c)

wherein $R^1$, $R^3$ and $R^5$ represent an alkyl group or alkenyl group each having 1 to 10 carbon atoms, in any case any one or not-adjacent two methylene ($—CH_2—$) groups may be replaced by oxygen atom ($—O—$), $R^2$, $R^4$, and $R^6$ represent an alkyl group or alkoxy group each having 1 to 10 carbon atoms, A represents 1,4-cyclohexylene or 1,4-phenylene, $Z^2$ represents —CH=CH— or —C≡C—, Y represents H or F, and p is 0 or 1.

13. The liquid crystal composition according to claim 4 wherein the liquid crystal composition further contains a compound expressed by any one of the following formulas (V-a) to (V-c)

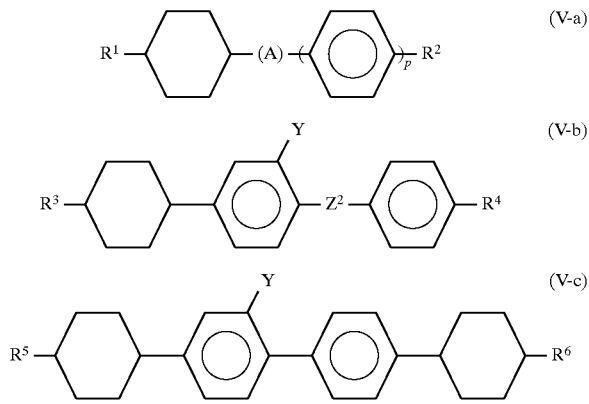

wherein $R^1$, $R^3$ and $R^5$ represent an alkyl group or alkenyl group each having 1 to 10 carbon atoms, in any case any one or not-adjacent two methylene (—CH$_2$—) groups may be replaced by oxygen atom (—O—), $R^2$, $R^4$, and $R^6$ represent an alkyl group or alkoxy group each having 1 to 10 carbon atoms, A represents 1,4-cyclohexylene or 1,4-phenylene, $Z^2$ represents —CH=CH— or —C≡C—, Y represents H or F, and p is 0 or 1.

14. The liquid crystal composition according to claim 11 wherein the liquid crystal composition further contains a compound expressed by any one of the following formulas (V-a) to (V-c)

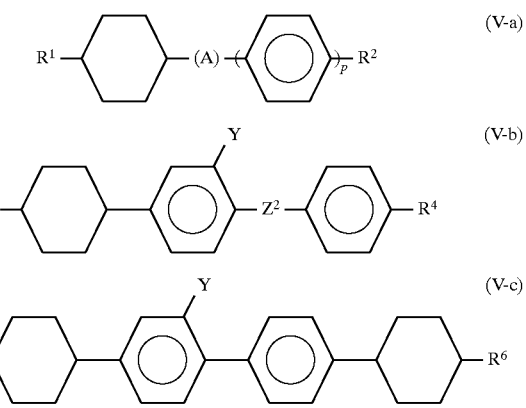

wherein $R^1$, $R^3$ and $R^5$ represent an alkyl group or alkenyl group each having 1 to 10 carbon atoms, in any case any one or not-adjacent two methylene (—CH$_2$—) groups may be replaced by oxygen atom (—O—), $R^2$, $R^4$, and $R^6$ represent an alkyl group or alkoxy group each having 1 to 10 carbon atoms, A represents 1,4-cyclohexylene or 1,4-phenylene, $Z^2$ represents —CH=CH— or —C≡C—, Y represents H or F, and p is 0 or 1.

15. A liquid crystal display device comprising the liquid crystal composition defined in claim 11.

16. A liquid crystal display device comprising the liquid crystal composition defined in claim 12.

17. A liquid crystal display device comprising the liquid crystal composition defined in claim 13.

18. A liquid crystal display device comprising the liquid crystal composition defined in claim 14.

* * * * *